(12) United States Patent
Apthorp

(10) Patent No.: US 8,148,841 B1
(45) Date of Patent: Apr. 3, 2012

(54) MODULAR WIND TURBINE SYSTEM

(76) Inventor: Scott Apthorp, North East, PA (US)

( * ) Notice: Subject to any disclaimer, the term of this patent is extended or adjusted under 35 U.S.C. 154(b) by 511 days.

(21) Appl. No.: 12/313,993

(22) Filed: Nov. 28, 2008

(51) Int. Cl.
F03B 13/10 (2006.01)

(52) U.S. Cl. ......................................... 290/55
(58) Field of Classification Search .................. 290/55
See application file for complete search history.

(56) References Cited

U.S. PATENT DOCUMENTS

| 4,025,233 | A | | 5/1977 | Moran | |
|---|---|---|---|---|---|
| 4,075,500 | A | | 2/1978 | Oman et al. | |
| 4,335,996 | A | | 6/1982 | Ross | |
| 4,449,889 | A | | 5/1984 | Belden | |
| 4,557,666 | A | | 12/1985 | Baskin et al. | |
| 4,720,640 | A | | 1/1988 | Anderson et al. | |
| 5,798,591 | A | * | 8/1998 | Lillington et al. | 310/164 |
| 6,132,181 | A | | 10/2000 | McCabe | |
| 6,552,460 | B2 | * | 4/2003 | Bales | 310/156.35 |
| 6,806,586 | B2 | * | 10/2004 | Wobben | 290/54 |
| 6,812,609 | B2 | * | 11/2004 | Anwander | 310/156.55 |
| 6,930,433 | B2 | * | 8/2005 | Bales et al. | 310/268 |
| 7,034,425 | B2 | * | 4/2006 | Detela | 310/162 |
| 7,214,029 | B2 | * | 5/2007 | Richter | 415/4.5 |
| 7,218,011 | B2 | * | 5/2007 | Hiel et al. | 290/43 |
| 7,304,396 | B2 | * | 12/2007 | Haje et al. | 290/1 R |
| 7,385,303 | B2 | * | 6/2008 | Roos | 290/54 |
| 7,605,486 | B2 | * | 10/2009 | Bridwell | 290/43 |
| 7,863,784 | B2 | * | 1/2011 | Ritz et al. | 310/68 B |
| 7,939,958 | B2 | * | 5/2011 | Todorof | 290/55 |
| 2003/0137149 | A1 | * | 7/2003 | Northrup et al. | 290/44 |
| 2011/0031760 | A1 | * | 2/2011 | Lugg | 290/55 |

FOREIGN PATENT DOCUMENTS

EP 45264 A * 2/1982

* cited by examiner

Primary Examiner — Joseph Waks
(74) Attorney, Agent, or Firm — Richard L. Mikesell

(57) ABSTRACT

A windmill includes a rotor having an outer blade edge of a stacked blade configuration windmill which generates electricity through outside rings which include wire windings. The outer blade edges are configured in a C-shape to enclose as much as ¾ of the outside ring to give mounting areas and overall blade stability. The system can be mounted in vehicles to charge batteries or provide for hydrogen separation in hydrogen cars as well as many other applications. The system can be modular so that a windmill of any suitable size can be constructed.

5 Claims, 3 Drawing Sheets

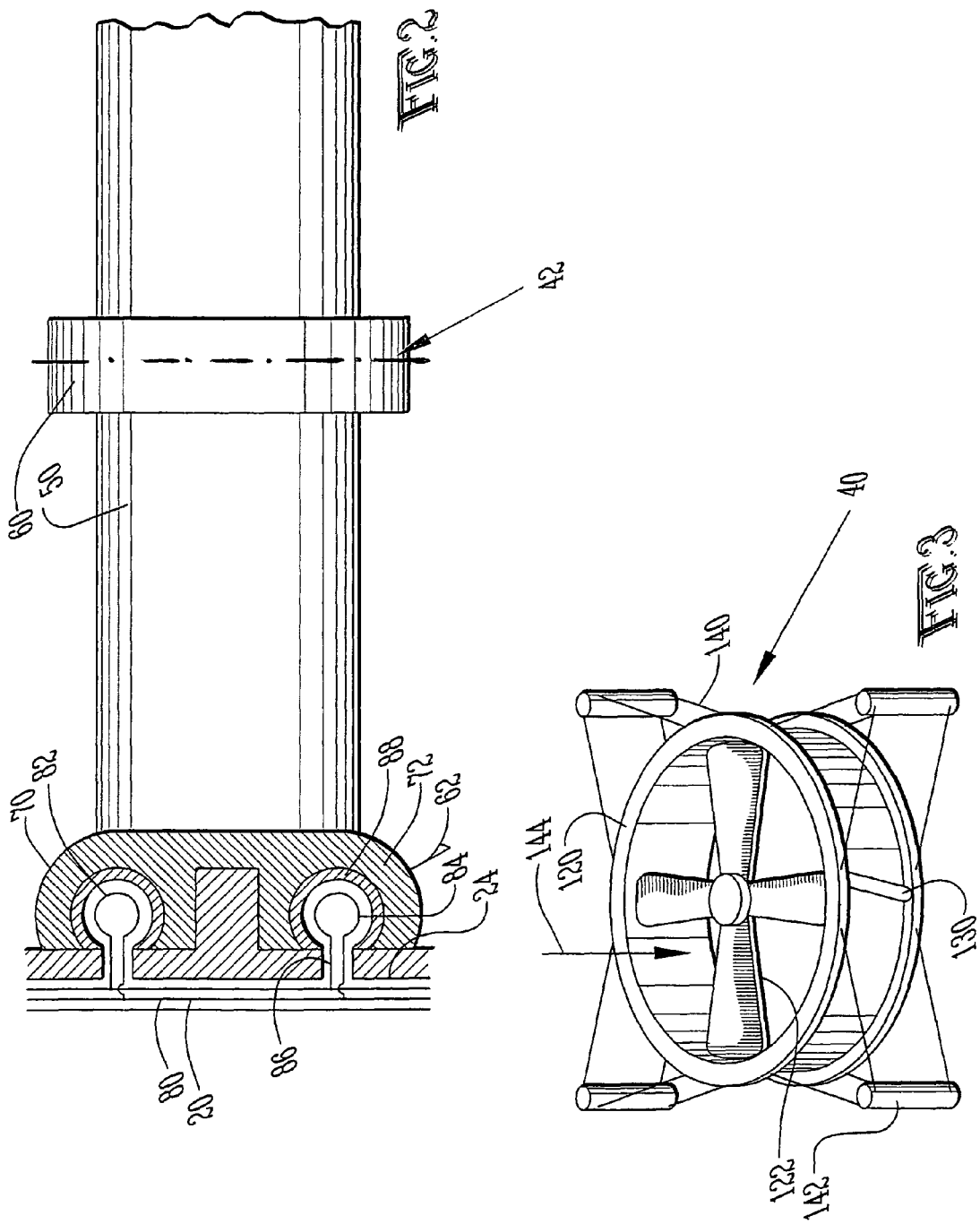

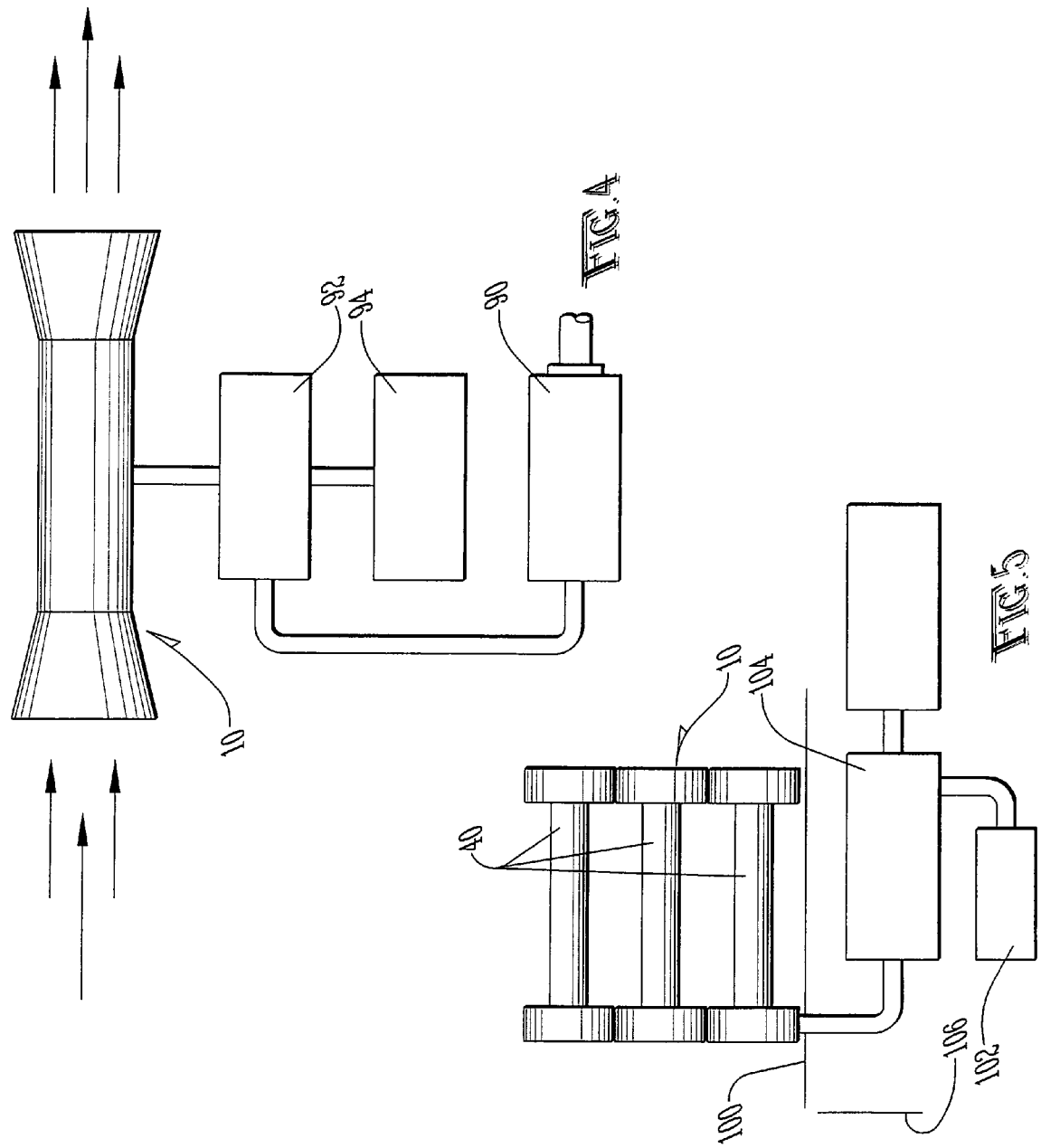

MODULAR WIND TURBINE SYSTEM

TECHNICAL FIELD OF THE INVENTION

The present invention relates to the general art of power generation, and to the particular field of windmills.

BACKGROUND OF THE INVENTION

A background summarization of the utilization of wind for generating electrical power has been documented in a NASA publication entitled "The Development of Wind Powered Installations For Electrical Power Generation In Germany", U. Hutter, NASA TTF-15,050 National Aeronautical and Space Administration, Washington, D.C. 20546, August 1973. Suffice it to say, one of the oldest methods of extracting energy from fluids in motion is by means of bladed rotating machines such as, for example, windmills exposed to the wind and hydro impellers powered by the fluid reaction of moving water. A history of the development of wind energy is presented by the publication entitled, "Wind Energy Developments In The Twentieth Century", published by the Lewis Research Center of the National Aeronautics and Space Administration, Cleveland, Ohio, in 1979. A wind turbine system, termed the "Mod-2 Wind Turbine", is described both in that publication and in another publication simply entitled, "Mod-2", published by the Bonneville Power Administration, U.S. Department of Energy. While these devices have been successfully employed for many hundreds of years, there still remain major unresolved technical problems in the design of conventional wind turbines which make them problematic for small and large scale energy production.

These technical problems fall into basically three categories: fluid dynamics, dynamic stress, and electrical conversion.

The fluid dynamic difficulties can best be appreciated by the Betz theory which expresses limitation on potential energy conversion and which is described in Technical Note #75 "Meteorological Aspects of Utilization of Wind as an Energy Source," World Meteorological Organization 1981. The column of air (wind) impelling upon the windmill blades is slowed and its boundary is an expanding envelope where streamlines meet turbulence behind the rotor. Attempts to shroud the envelope to utilize the lower pressure behind the blades as a fluid dynamic advantage have been suggested in U.S. Pat. No. 4,075,500 as well as others. To date no practical cost-effective method exists for fabricating ducted shrouds, much less balance them on support structures.

Mechanical stresses induced on the blading and support structure present further limitations especially for large windmills. On the supporting structure the axial stress representing the force which tends to overturn the windmill, or the thrust on the bearing, must be kept within limits at all wind speeds. To accomplish these results and to generate sufficient and efficient power, large diameter blades with built-in governors for adjusting the pitch angles of the blades have been utilized. These mechanisms proposed to date make the blades fragile and costly.

Furthermore, large diameter blades, such as over 100 feet in length, present significant dynamic stress problems. The increased blade length of larger rotors requires greatly increased blade stiffness and reduced weight in order to insure that critical vibrational frequencies of the blade remain sufficiently outside the excitation frequencies associated with routine operation so that the blades do not become unstable. A combination of gravitational force and torque force on each blade element functions to cyclically stress the blade element as it rotates in a rising direction and then a falling direction. Long blades supported at their roots and under the influence of the aforementioned oscillating forces are subjected to an increasingly severe and complex system of dynamic instabilities. It is difficult and expensive to safeguard against such instabilities. Blade stiffness to weight ratio improvements and advanced design methods can help but there is always a practical maximum to the size of blades being employed by wind turbines.

Finally, conventional wind turbines generate power through a gearbox and conventional generator. Although these generators are commonly available, they represent a one hundred year old technology that has not incorporated recent technological breakthroughs in material science, power control and aerodynamics. These generators, while compact, are heavy because of the massive laminated iron core and copper windings.

It is well known now that the change of wind momentum by aerodynamic forces on the rotor blades is limited in energy output by several factors. First, the ideal efficiency is limited to about 0.593 of the wind power per unit area by the unavoidable shedding of flow around the tip of the rotor. Secondly, occasional extremes of wind speeds can lead to destruction of the rotor blades, unless controls be employed to reduce the geometric obstruction presented by the rotor. This control measure limits maximum output to be expected from a wind turbine. Thirdly, the aerodynamics of the tower supporting the wind driven rotor must be taken into account in the design of the blades whether located ahead of or behind the rotor to the determent of structural cost to accommodate the aerodynamic loading such structures create.

It has long been thought that substantial performance advantages could be realized by the use of a shroud and diffuser on a wind turbine (see "A Preliminary Report on Design and Performance of Ducted Windmills", G. N. M. Lilley and W. J. Rainbird, the British Electrical and Allied Industries Research Association, Great Britian, Technical Report C/T119, 1957). Prior work indicated that the diffuser augmented turbines could produce up to twice the power of unshrouded turbines of the same diameter. Thus, over the years, many groups have become interested in the diffuser-augmented windmills, but they have always dropped the idea because the diffuser has to be so much larger than the windmill rotor that the system has been heretofore considered economically impractical.

An electric generator, driven by a wind turbine serves as a source of electric power which may be utilized at remote sites where electric power may not normally be available. For example, in a sailboat moored, anchored or at a dock between usage periods, such a turbine driven generator may be deployed for recharging the batteries which power the radios, pumps, lights, and other electrical devices aboard the sailboat. Such devices can also be used on land vehicles as well.

As can be understood from the foregoing, the windmill has developed over its long history into many different and varied forms. These varied forms seek to expound upon particular aerodynamic or economic factors. In some cases, prior art windmills have been designed for aerodynamic efficiency in low speed winds. Such high efficiency windmills often were prone to damage or destruction from excessive rotational speed when exposed to high speed winds. Since the velocity of winds vary over a wide range in most areas, aerodynamic efficiency is not the sole factor for providing an economically attractive windmill.

All windmills suffer from the large forces developed on the windmill and its tower or other supporting structure during times of high velocity winds. These large forces require that both the windmill and supporting structure be strongly built. Windmills are usually mounted atop relatively tall towers to take advantage of the higher velocity winds which exist only a short distance above the ground. High wind loads applied to the windmill and tower create very large bending moments which the tower must support. In the case of horizontal axis windmills, these large bending moments cannot be alleviated by the use of guy wires or struts because the rotating windmill blades pass near to the tower along all sides of the tower as the direction of the winds change and the windmill turns with the wind. This dictates that long, slender towers without guy wires be used. Such towers are relatively expensive and the overall cost of the windmill installation is increased when compared to towers supported by guy wires.

Large scale prior art horizontal windmills also cause additional forces to be applied to the tower when the large rotor blades pass very near the windmill tower. In such large windmills, the periodic passage of the blades by the tower can create a vibratory loading which further accentuates the problem of building a sufficiently strong tower.

Another problem suffered by prior art vertical and horizontal windmills is the large fluctuations in windmill rotor speed caused by varying wind velocity. This variation in the rotor speed creates difficulties in coordinating power generated by windmills into an electrical distribution system having a fixed frequency of alternating current. The great fluctuation in windmill speed also creates problems in the mechanical design of windmills since stresses increase considerably with increased rotational speed.

Sudden changes in wind direction also have been a problem in obtaining optimum efficiency from windmills. This is especially true with horizontal axis windmills which are resistant to changes in wind direction because of the gyroscopic effect of the spinning windmill. This gyroscopic effect reduces the efficiency of the windmill because it cannot change direction sufficiently fast so as to take advantage of the full force of the wind. Vertical axis windmills have been effective in dealing with the wind direction change and gyroscopic effect problems but have still suffered from wide fluctuations in angular speed due to wind velocity changes. Sudden changes in wind direction can also cause the rotor blades to warp or flap and in some cases damage or destroy them.

Therefore, there is a need for an improved windmill that is efficient, yet is not as subject to damage from high and changeable winds as prior art windmills.

SUMMARY OF THE INVENTION

These, and other, advantages are achieved by the system embodying the present invention in which improved power output of as much as 10 to 15 times that of a normal windmill with an added benefit of blade stability in drastic wind velocity changes is realized by using an outer blade edge of a stacked blade configuration windmill to generate electricity through outside rings which include wire windings. The outer blade edges are configured in a C-shape to enclose as much as 3/4 of the outside ring to give mounting areas and overall blade stability. The system can be mounted in vehicles to charge batteries or provide for hydrogen separation in hydrogen cars as well as many other applications. The system can be modular so that a windmill of any suitable size can be constructed.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 2 is a sketch of an outer end of a rotor blade in conjunction with coils located on an inner surface of a housing, the other end of the rotor blade being identical to the end shown in FIG. 2.

FIG. 3 is a perspective view of one form of the invention.

FIG. 4 is a block diagram illustrating the windmill of the present invention in conjunction with a motor that is driven by the windmill.

FIG. 5 is a block diagram illustrating the windmill of the present invention in conjunction with a static structure.

DETAILED DESCRIPTION OF THE INVENTION

Figure 1:
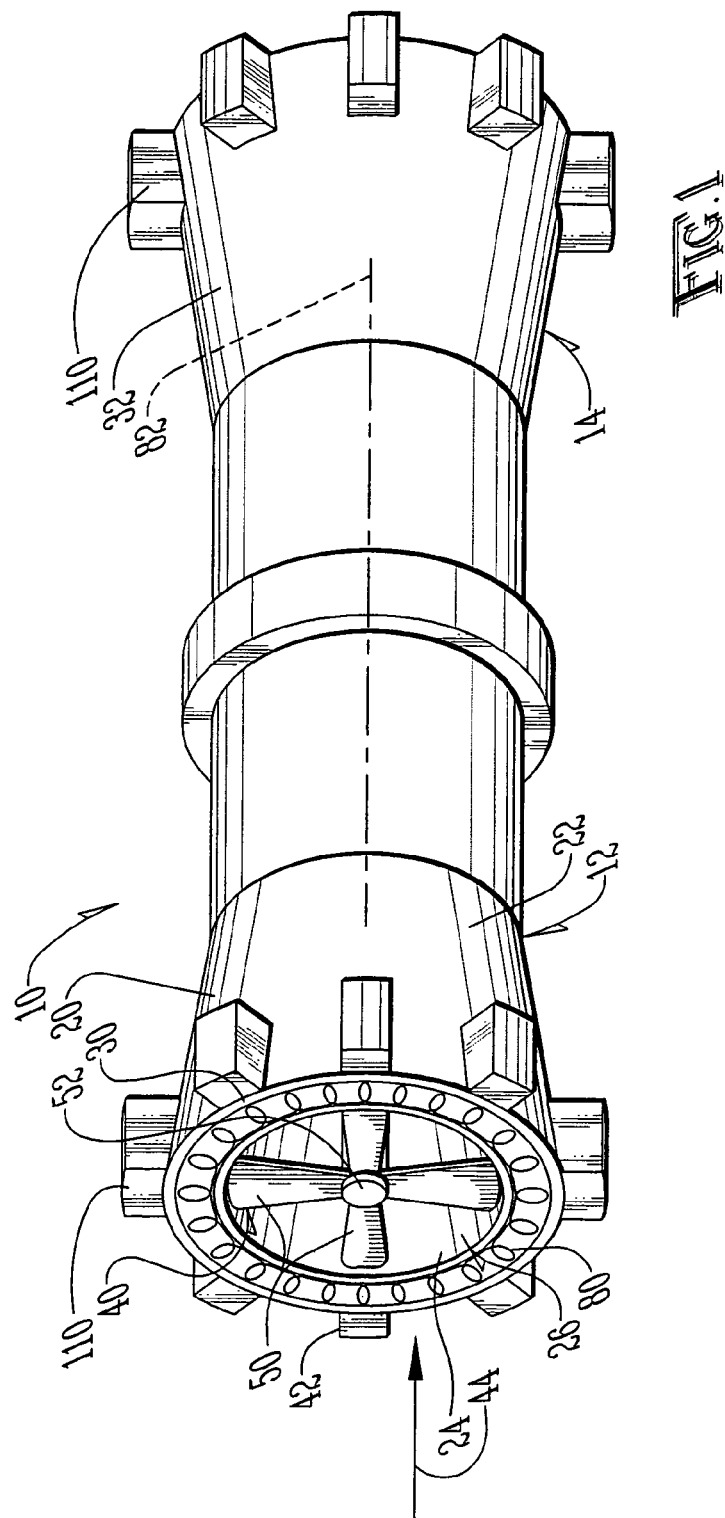
FIG. 1 is a perspective view of a windmill embodying the principles of the present invention.

Referring to the figures, it can be understood that the present invention is embodied in a windmill 10 which can be used in conjunction with various powered systems, including, but not limited to, static structures, such as houses or the like, vehicles, such as automobiles or the like and other such systems. System 10 is modular so it can be sized according to the requirements of the system being powered. Two modules 12 and 14 are shown in FIG. 1, but this should be considered as being an example only and more modules can be used as required without departing from the scope of this disclosure. Windmill 10 includes an outer casing 20 which can be sized and shaped in accordance with the requirements of the system and in accordance with the requirements of the airflow through the system. The shape shown in FIG. 1 is a converging/diverging shape, but other shapes can be used as well.

Outer casing 20 includes an outer surface 22 and an inner surface 24 which defines a bore 26 that extends axially through the casing from first end 30 to second end 32. A support structure 34 surrounds the outer casing.

At least one rotor system 40 is rotatably supported in bore 26 to rotate around longitudinal axis 42 of the bore under the influence of air flowing through the bore as indicated by arrow 44. Rotor system 40 is located adjacent to first end 30, and a similar rotor system can be located adjacent to second end 32. Additional rotor systems can also be located within casing 20. Rotor system 40 includes a plurality of rotor blades, such as blade 50, rotatably mounted on a shaft 52. The additional rotor systems in windmill 10 also include rotor blades which are shaped to rotate in the same direction as blades 50 or system 40 when air flows through the casing in direction 44 whereby all the rotor systems work together to generate electricity. The rotor systems are positioned inside the casing and are thus protected from damage due to high and changing winds as well as from flying debris.

As can be seen in FIG. 2, each rotor blade 50 includes a support element 60 located centrally thereof and an outer edge 62 which is located adjacent to and spaced apart from inner surface 24 of the casing so the rotor blade can rotate without interfering with the inner surface of the casing. Outer edge 62 of rotor blade 50 has two C-shaped areas 70 and 72 defined thereon to be concave with respect to inner surface 24 for a purpose that will be understood from the teaching of this disclosure. The areas 70 and 72 are spaced apart from each other in the direction of longitudinal axis 42.

A coil assembly 80 is located on casing 20 to be adjacent to the outer edge of the rotor blade. Coil assembly 80 includes two inducting coils 82 and 84 that extend inwardly from inner surface 24 of the casing toward the rotor blade outer edge. Each coil includes a base 86 supporting an arcuate head 88. Each of the C-shaped areas 70 and 72 are sized to surround as much as ¾ of the circumferential area of the inductive coil associated therewith. The coils are electrically connected to powered systems, such as the drive motor 90 shown in FIG. 4 via a phase controller 92. A battery 94 can also be connected to the phase controller. This system can be used in a motor vehicle. An other application of the windmill is shown in FIG. 5 in which the windmill is located on top of a roof 100 and is connected to a battery 102 via a phase controller 104 to power systems in a building 106 associated with the roof. It is noted that three modules are shown in FIG. 5 as an illustration of the plurality of modules that can be used for the present invention.

Magnetic assemblies, such as magnetic assembly 110, are located on outer surface 22 of the casing and are electrically connected to the coils located inside the casing. The magnetic assemblies can also be used as mounting brackets when a plurality of modules are connected together.

A form of the invention is shown schematically in FIG. 3 with a top ring 120 having a coil located therein surrounding a rotor system 122 and a bottom ring 130 having a coil located therein surrounding a rotor system 132. Struts 140 and 142 support the systems. Air flows vertically in the system shown in FIG. 3 as indicated by arrow 144; whereas, air can flow horizontally in the systems shown in FIGS. 1 and 4 as indicated by arrows 44 and 144.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A windmill comprising:

An outer casing having a bore defined therein, the outer casing having an inner surface located adjacent to the bore;

a coil assembly mounted on the outer casing adjacent to the bore to extend into the bore~ the coil assembly including two inductor coils mounted on the inner surface of the outer casing and extending radially inwardly into the bore, the two inductor coils being spaced apart from each other; and a rotor system located inside the bore, said rotor system comprising a rotor including a plurality of blades which are rotatably mounted in said rotor system to rotate with respect to the inner surface of the outer casing, each blade having an outer edge which is located adjacent to the inner surface of the outer casing, and each blade further including two spaced apart C-shaped cutout areas defined therein to be located adjacent to the outer edge and adjacent to the inner surface of the outer casing, each cutout area in each blade being located and sized to surround at least ¾ of an associated coil of the coil assembly and at least partially enclose the associated coil of the coil assembly within the cutout area defined in the blade, the cutout area being sized to permit the blade of the rotor to move with respect to the associated coil of the coil assembly without interference so that the blade of the rotor can rotate with respect to the coil assembly while the outer edge of the rotor passes by the coil assembly.

2. The windmill defined in claim 1 further including a second rotor located inside the bore adjacent to the rotor.

3. The windmill defined in claim 1 further including a powered device electrically connected to the coil assembly.

4. The windmill defined in claim 3 wherein the powered device includes a motor vehicle.

5. The windmill defined in claim 3 wherein the powered device includes a house.

* * * * *